United States Patent [19]
Gal

[11] Patent Number: 5,522,544
[45] Date of Patent: Jun. 4, 1996

[54] ORCHARD OR GROVE SPRAYER

[75] Inventor: Yossi Gal, Kibbutz Deqania Bet, Israel

[73] Assignee: Durand-Wayland, Inc., LaGrange, Ga.

[21] Appl. No.: 332,672

[22] Filed: Nov. 1, 1994

[30]      Foreign Application Priority Data

Nov. 1, 1993  [IL]  Israel ......................................... 107455

[51] Int. Cl.⁶ ............................... B05B 7/26; B05B 9/06
[52] U.S. Cl. ............................................................ 239/78
[58] Field of Search ........................................ 239/77, 78

[56]                  References Cited

U.S. PATENT DOCUMENTS 2,925,222  2/1960  Spreng .................................. 239/77 X
3,501,096  3/1970  Stilwell et al. ...................... 239/77 X
4,875,526  10/1984  Latino et al. ....................... 239/148 X
4,927,080  5/1990  Alsing ...................................... 239/77
5,383,599  1/1995  Zur ........................................... 239/77

*Primary Examiner*—Kevin P. Weldon
*Attorney, Agent, or Firm*—Jones & Askew

[57]                    ABSTRACT

An improved orchard or grove sprayer having a rigid tubular member arranged to receive the discharge from a blower, flexible upper and lower sleeves secured to the rigid member, and turning vanes secured in the rigid member to direct the majority of air discharged from the blower into the upper flexible sleeve. A clevis and pin located below the lower sleeve connect the sprayer to a trailer carrying a tank, and the flexible sleeve permits inserting and removing the pin while the blower is inoperative. A support post stabilizes the upper sleeve.

5 Claims, 1 Drawing Sheet

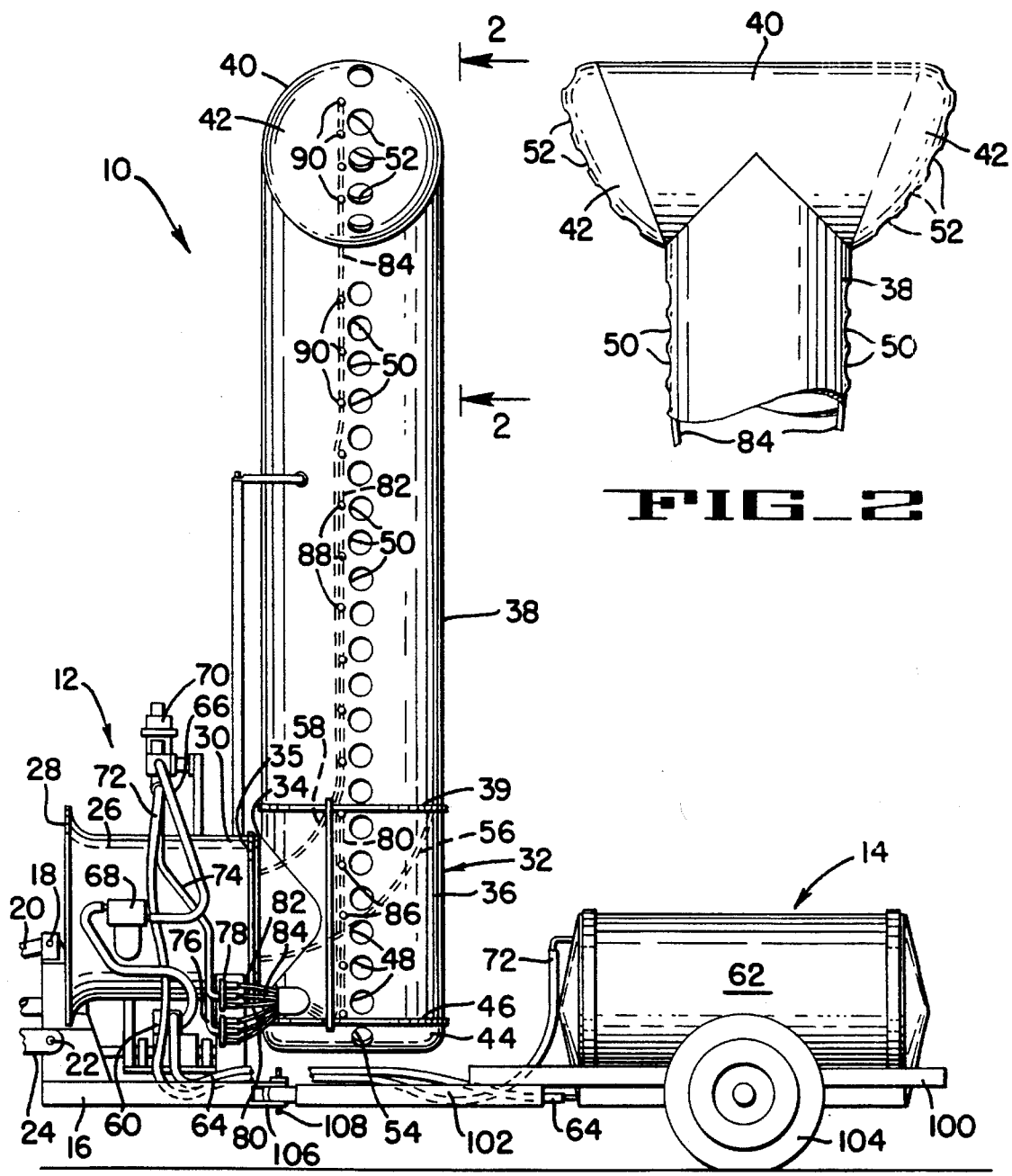

ORCHARD OR GROVE SPRAYER

This invention relates to sprayers generally, and more particularly to sprayers especially suited for operation in orchards or citrus groves.

The application of treatment chemicals, such as insecticides, fungicides and the like, to trees planted in rows, as is universally practiced in orchards and citrus groves, is necessary for protection of the trees as well as the economical production of marketable fruit and juice. Since insects and fungi tend to congregate on the underneath side of the leaves, the prior art devices, as represented by U.S. Pat. No. 3,009,644, for example, have employed a fan or blower to direct a open stream of air at high velocity at the trees, with liquid chemical being sprayed into the air stream. The air stream rustles the leaves to permit a more uniform coating of both sides of the leaves with the treatment chemical. In order to reduce the power requirements of such prior art devices and to effect a more efficient utilization of the chemical, as well as a more uniform distribution of the chemical on the trees, a recent development has been the utilization of an inflatable vertical sleeve arranged to receive the stream of air from the blower output and confine such stream while directing it vertically before discharging the air toward the trees at a plurality of locations along the length of the sleeve, as is shown in Israel Patent Application Ser. No. 105,452, filed Apr. 19, 1993. This invention improves upon the aforementioned recent development by providing a more uniform distribution of air along the length of the sleeve and a arrangement which allows longer and more efficient operation in the orchard or grove.

The present invention provides a vertical boom air sprayer which is more uniform and efficient in distribution of the chemical, which is capable of longer operation in the orchard or grove and which is relatively easy to use and maintain. These and other attributes of the present invention, and many of the attendant advantages thereof, will become more readily apparent from a perusal of the following description of a preferred embodiment and the accompanying drawings, wherein:

FIG. 1 is a side elevational view of a sprayer according to the present invention showing it mounted on the three-point hitch of a conventional tractor: and FIG. 2 is a view taken on line 2—2 of FIG. 1 showing the top portion of the sleeve.

Referring to FIG. 1, there is shown a sprayer, indicated generally at 10, which includes a distribution unit 12 and a trailer 14, the power unit having a frame 16 removably pinned at 18 to the upper link 20 and at 22 to the lower links, one of which is shown at 24, of a conventional three-point hitch typically provided on farm tractors. A blower 26 is mounted on the frame 16 and has an air inlet 28 and a discharge end 30 through which a stream of high velocity air is delivered. A rigid tee-shaped member 32 has a central tube 34 connected to, such as by band clamp 35, and supported by the discharge end 30 of the blower 26 to receive the air discharged therefrom. The central tube 34 forms the tee by connecting with the midpoint of an upright tube 36 of essentially the same diameter. A cylindrical upper sleeve 38 formed of a flexible material which is waterproof and resistant to tearing, such as nylon canvas impregnated with vinyl, and having a diameter to mate with the upright tube, is attached to, such as by band clamp 39, and communicates with the upper end of the upright tube. The end of the sleeve opposite its attachment to the upright tube is closed, preferably by a cross tube 40 of the same diameter and formed of the same material as the sleeve 38. The cross tube 40 extends laterally in a direction transverse to as the longitudinal axis of the blower 26. The ends of the cross tube angle inward and downward toward the sleeve and are closed by generally oval shaped pieces 42 formed of the same material. When inflated by air from the blower, the sleeve extends substantially vertical. A closed-end lower sleeve 44 formed of the same material as the upper sleeve 38 and having the same diameter is secured to, such as by band clamp 46 and in communication with the lower end of the upright tube 36.

The upright tube 36 has a row of air discharge holes 48 extending along each of its lateral sides, i.e., the sides nearest to the trees during operation of the sprayer. A similar row of holes 50 extend along each of the lateral sides of the upper sleeve 38 and a row of holes 52 are provided in each of the pieces 42. The lower sleeve 44 is also preferably provided with at least one hole 54 on each of its lateral sides. The holes are all substantially aligned so that, when the sleeves are inflated, they define a generally continuous vertical row of holes uniformly spaced apart. To assure a more equal distribution of the air from the holes, a pair of turning vanes 56 and 58 are secured inside the member 32 and direct most of the air discharged from the blower 26 toward the upper sleeve 38. The end of the vane 56 is positioned adjacent the discharge end 30 of the blower to permit a limited flow of air to the lower side of this vane. Such limited flow is sufficient to supply air to the holes 54 in the lower sleeve and to those holes 48 in the upright tube which are below the vane 56. Thus, a more uniform discharge of air is achieved from all of the holes. The vanes 56 and 58, as well as the member 32, are preferably made of stainless steel so that they are sufficiently rigid and resistant to corrosion.

The liquid chemical solution must be introduced into the air discharged through the holes 48, 50, 52 and 54 for application to the trees. To accomplish this, a driven pump 60 draws chemical solution from a tank 62 mounted on the trailer 14 through a suction line 64 and discharges the liquid under pressure into pressure conduit 66. A pressure filter 68 is interposed in conduit 66 to reduce the possibility of small-orifice nozzles down stream from becoming clogged. A valve bank 70 is connected to the pressure conduit 66 The valve bank includes a manually adjustable pressure relief valve which dumps solution into the return line 72 connecting with the tank 62 to relief excess pressure, a proportional flow control valve for assuring some portion of the pump output is returned to tank 62 through line 72 to agitate the solution in the tank, and a pair of electrically operated valves for directing the solution to left and right supply lines 74 and 76. Each of the supply lines connects with a manifold which connects with branch lines. The left side branches are shown in FIG. 1 with the right side being essentially a mirror image thereof. The supply line 74 connects with manifold 78 to which branch lines 80, 82 and 84 are connected, which lines extend into the interior of the upright tube 36. The branch line 80 is connected to a plurality of nozzles 86, which are carried by and extend through the side of the tube 36. The nozzles 86 are positioned in a line adjacent the row of holes 48 on the left side of the upright tube. The branch line 82 is connected to a plurality of nozzles 88 carried by and extending through the lower half of the sleeve 38, with the nozzles being arranged alongside the holes 50 on the left side of the sleeve 38. The branch line 84 is connected to nozzles 90 which are similarly mounted on the upper portion of the sleeve 38 as well as the piece 42. The nozzles 86, 88 and 90, being separately supplied by branch lines 80, 82 and 84, distribute the solution more uniformly because the pressure drop from the first nozzle to the last in each branch is relatively small, whereas such pressure drop would be significant, resulting in unacceptable reduced flow at lower pressures, if the nozzles were all connected to a single supply line.

The trailer 14 has a frame 100, including a tongue or draft member 102, mounted on ground-engaging wheels 104. The frame 16 of the unit 12 is provided with a clevis 106 which accepts the tongue 102. A pin 108 insertable through alignable holes in the clevis and tongue permits selectively connecting the trailer to the unit, so that the trailer may be towed by the tractor, or disconnecting the trailer so the unit 12 may be dismounted. i.e., disconnected from the tractor's three-point hitch, or so maintenance or repair work may be performed. The connection of the tongue of towed equipment to a clevis carried directly or indirectly by a prime mover, such as a farm tractor, is normally simple. However, two requirements complicate the attachment in this case. One is the desirability of locating the means for distribution of the chemical solution close to the ground in order to treat parts of the tree at that level. The other requirement is to maintain good maneuverability and ease of handling the tractor and trailer as a unit, including tracking capability. The result is that the clevis must be located on the frame 16 underneath and in close proximity to the bottom of the lower sleeve 44. If the lower sleeve were incorporated into the member 32, and thus made rigid, extraction and insertion of the pin would be difficult if not impossible. Because the lower sleeve is flexible, and since connection to the clevis would be made when the blower is not being operated, it is a relatively easy to simply deflect the flexible lower sleeve aside to insert or remove the pin 108.

In order stabilize the upper sleeve 38 and maintain its desired vertical orientation when inflated, and to prevent damage thereto by reducing contact with the ground and objects thereon when not inflated, a support post is secured to the housing of the blower 26 and is secured to the upper sleeve 38.

While a preferred embodiment of the present invention has been illustrated and described herein, it will be appreciated that various changes and modifications as may be therein without departing from the spirit of the invention as defined by the scope of the appended claims.

What is claimed is:

1. A spraying apparatus for distributing a chemical solution on the trees of an orchard or grove, the apparatus comprising:
   a frame capable of being removably connected to a three-point hitch;
   a blower mounted on said frame and having an outlet for discharging air;
   a rigid tubular member having upper and lower ends, said tubular member intermediate its ends being attached to and communicating with the outlet of said blower;
   a flexible upper sleeve member having a longitudinal axis extending essentially vertical when inflated attached to the upper end of said rigid member and in communication therewith;
   a flexible lower sleeve having an opening attached to the lower end of said rigid member and in communication therewith;
   said flexible and rigid members being provided with air discharge holes defining substantially aligned rows extending along the lateral sides thereof; and
   turning vanes secured in said rigid member to direct the majority of the air discharged from said outlet into said upper flexible member.

2. The invention according to claim 1 wherein said rigid member overhangs said frame, and further comprising:
   a trailer having a tank for carrying said chemical solution and a tongue for connection to said frame;
   clevis means affixed to said frame and positioned under said rigid tubular member in close proximity to the bottom of the flexible lower sleeve, for receiving said tongue; and
   pin means selectively insertable from an upper side of the clevis for releasably connecting said tongue to said clevis, so that inserting or removing the pin from the clevis would be difficult or impossible but for the flexible nature of the lower sleeve;
   whereby said pin means is insertable and removable with respect to said clevis by deflecting said lower flexible member while the blower is inoperative.

3. The spraying apparatus as in claim 1, further comprising:
   a support element extending upright from the frame alongside the upper sleeve member and secured to the upper sleeve member, so as to maintain a predetermined vertical orientation of the upper sleeve member when inflated.

4. A spraying apparatus for distributing a chemical solution on the trees of an orchard or grove; the apparatus comprising:
   a frame capable of being removably connected to a hitch;
   a blower mounted on said frame and having an outlet for discharging air;
   a rigid tubular member overhanging said frame and having upper and lower ends, said tubular member intermediate its ends being attached to and communicating with the outlet of said blower;
   a flexible upper sleeve member having a longitudinal axis extending essentially vertical when inflated attached to the upper end of said rigid member and in communication therewith;
   a flexible lower sleeve having an opening attached to the lower end of said rigid member and in communication therewith;
   said flexible and rigid members being provided with air discharge holes defining substantially aligned rows extending along the lateral sides thereof;
   clevis means affixed to said frame and positioned under said rigid tubular member in close proximity to the bottom of the flexible lower sleeve, for selectively receiving the tongue of a trailer carrying the chemical solution; and
   pin means selectively insertable from an upper side of the clevis for releasably connecting the tongue to said clevis, so that inserting or removing the pin from the clevis would be difficult or impossible but for the flexible nature of the lower sleeve, whereby said pin means is insertable into and removable from said clevis by deflecting said lower flexible member while said blower is inoperative.

5. A spraying apparatus for distributing a chemical solution on the trees of an orchard or grove, the apparatus comprising:
   a frame capable of King removably connected to a three-point hitch;
   a blower mounted on said frame and having an outlet for discharging air;
   a rigid tubular member having upper and lower ends attached intermediate its ends to and communicating with the outlet of said blower;

a flexible upper sleeve member having a longitudinal axis extending essentially vertical when inflated attached to the upper end of said rigid member and in communication therewith;

a flexible lower sleeve having an opening attached to the lower end of said rigid member and in communication therewith;

said flexible and rigid members being provided with air discharge holes defining substantially aligned rows extending along the lateral sides thereof;

turning vanes secured in said rigid member to direct the majority of the air discharged from said outlet into said upper flexible member;

the upper end of said upper sleeve member having a discharge head comprising a flexible cross tube having substantially the same diameter as said upper member and secured intermediate its ends to said upper member in fluid communication therewith;

said cross tube being oriented to extend toward said trees in aligned rows;

said cross tube having ends which angle inward toward said upper member; and flexible pieces secured to and closing each end of the cross tube, said pieces having air discharge openings substantially aligned with said aligned rows.

* * * * *